United States Patent [19]

MacIsaac

[11] 4,050,732
[45] Sept. 27, 1977

[54] CAMPER ASSEMBLY

[76] Inventor: Gerard Connor MacIsaac, 17 McCubbin Street, Burwood, Victoria, Australia

[21] Appl. No.: 654,509

[22] Filed: Feb. 2, 1976

[30] Foreign Application Priority Data

Feb. 11, 1975 Australia .................................. 554/75

[51] Int. Cl.² ............................................... B60P 3/34
[52] U.S. Cl. .................................. 296/23 A; 135/3 A; 224/42.1 E; 296/23 G
[58] Field of Search ................. 296/23 R, 23 A, 23 F, 296/23 G; 224/42.1 R, 42.1 E; 135/1 A, 3 A, 5 A, 7.1 A

[56] References Cited

U.S. PATENT DOCUMENTS

| 2,907,077 | 10/1959 | Pugsley | 135/1 A |
| 2,930,051 | 3/1960 | Kampmeier | 135/1 A |
| 3,040,756 | 6/1962 | Zerbe | 135/3 A |
| 3,088,475 | 5/1963 | Muhr | 135/1 A |
| 3,680,909 | 8/1972 | Greif | 296/23 R |
| 3,843,190 | 10/1974 | Julian | 224/42.1 E |
| 3,917,337 | 11/1975 | Couix | 135/1 A |

Primary Examiner—Joseph F. Peters, Jr.
Assistant Examiner—John A. Carroll

[57] ABSTRACT

A camper assembly which includes a rigid bed panel and is capable of being carried on the cabin roof of a motor car. The assembly is designed to be lowered off the roof and opened up by manual manipulation on a camp site separate from the car.

15 Claims, 18 Drawing Figures

CAMPER ASSEMBLY

This invention relates to a camper assembly and to a mount for supporting the assembly on the roof of a motor vehicle.

In an endeavour to obviate the disadvantages inherent in the weight and bulk of the conventional caravan, a considerable variety of camper assemblies have been proposed in which enclosed living quarters are provided in a form which may be collapsed into a compact, relatively light weight and easily transportable unit. Such assemblies have to date generally comprised either a small self-contained trailer from which the living quarters may be developed by withdrawal of various components stored in the trailer; or a unit which may be carried on the roof of the normal family car. In the former arrangement, the trailer itself serves as a central rigid support for the expanded assembly, while in the latter case the expanded structure is supported from a base frame, panel or tray which typically remains on the roof of the car. In one known construction, a single base plate is fixed to the roof-rack of the car but the assembly as a whole may be temporarily supported in an elevated condition on stilts to permit withdrawl of the car from under it, an arrangement of somewhat less than satisfactory stability. In another known alternative construction, expansion actually necessitates withdrawl of the car from between stilts supporting the box-like camper unit. A floor is then winched down to ground level while the balance of the rigid external structure forms the roof. Side wings folded out and rested directly on the ground support bed mattresses.

While this alternative structure is more stable than the wholly raised form, the presence of four solid panel components gives rise to an excessive weight on the vehicle roof and to the necessary provision of mechanical aids for performance of the expansion and retraction operations.

This present invention stems from a realization that while the afore-described camper assemblies are less bulky and generally more manageable than the conventional caravan, a still better form of assembly which retains the advantages of a camper relative to a mere tent can be provided if the camper is rendered solid and yet manually manipulable from roof to rack to ground for simple assembly without need of mechanical aids.

The invention accordingly provides, in one aspect, a camper assembly comprising a substantially rigid panel, framework pivotally mounted to the panel, and flexible sheet material secured to the framework, which assembly is expansible from a collapsed condition in which the framework and sheet material lie against the panel to a developed condition in which the panel defines a base for a bed and the sheet material is supported by the framework in a raised position as a cover for a space above the panel and an adjoining annex area, wherein the assembly is dimensioned for transport on the cabin roof of a passenger road vehicle in its collapsed condition and wherein the gross weight of the panel, framework and sheet material is less than 75 lbs.

In a second more particular aspect of the invention, there is provided a camper assembly comprising a pair of substantially rigid panels, framework pivotally mounted to the panels and flexible sheet material secured to the framework, which assembly is expansible from a collapsed condition in which the panels overlie each other and sandwich the sheet material and framework therebetween to a developed condition in which the panels lie spaced apart to one side of each other to each define a base for a bed and are bridged by the sheet material being disposed in a raised position as a cover for a space above the panels and above the spacing between them, wherein the assembly is dimensioned for transport on the cabin roof of a passenger road vehicle in its collapsed condition and wherein the gross weight of the panels, framework and sheet material is less than 120 lbs.

For supporting the invention assembly in either of its aspects on the cabin roof of a vehicle, the invention further provides a vehicle roof mount comprising a carry frame, means to detachably mount the frame on the cabin roof of a vehicle, respective spaced sets of prongs for engaging the collapsed assembly along respective sides thereof and so retaining it on the carry frame, one set of which prongs being withdrawable to release the assembly.

The invention will now be described by way of example with reference to the accompanying drawings, in which:

FIGS. 15 and 16 are respective cross-sections on the lines 15—15 and 16—16 of FIG. 10; and FIGS. 17 and 18 are similar perspective views of the drop-in bucket floor forming part of the developed camper and respectively depict the bucket floor in its closed and walk-through conditions.

Figure 1:
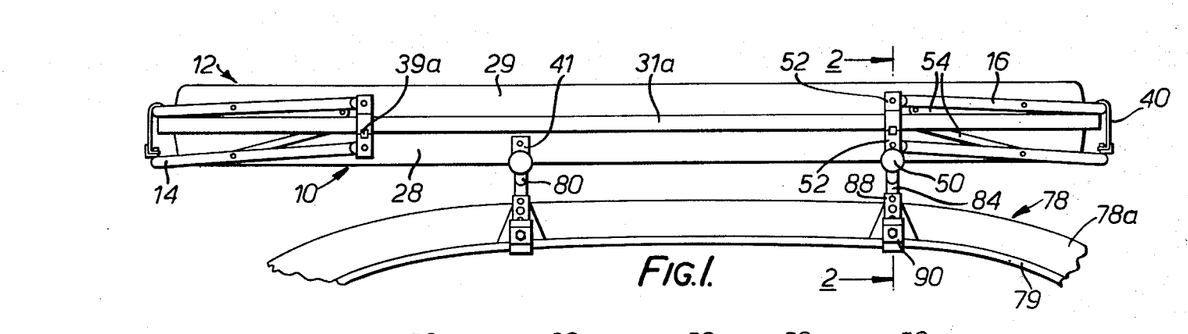
FIG. 1 is a view in side elevation of a camper in accordance with the invention, the camper being shown supported in its collapsed condition on a vehicle roof carry frame.
Figure 10:
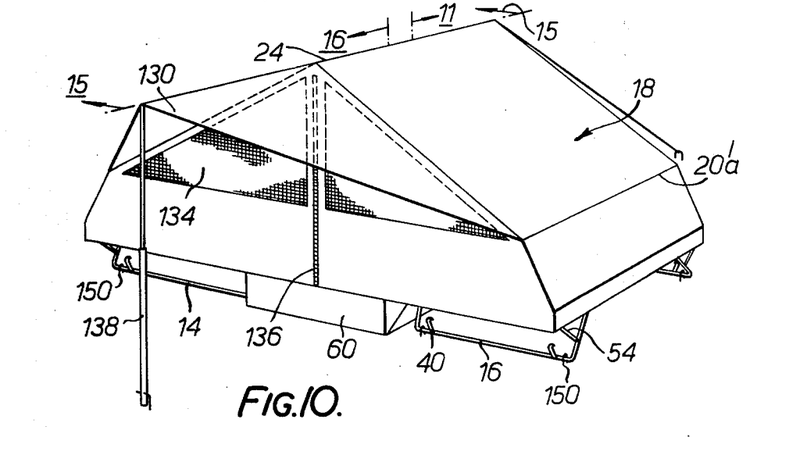
FIG. 10 is a perspective view of the fully developed camper.
Figures 11, 12, 13, 14:
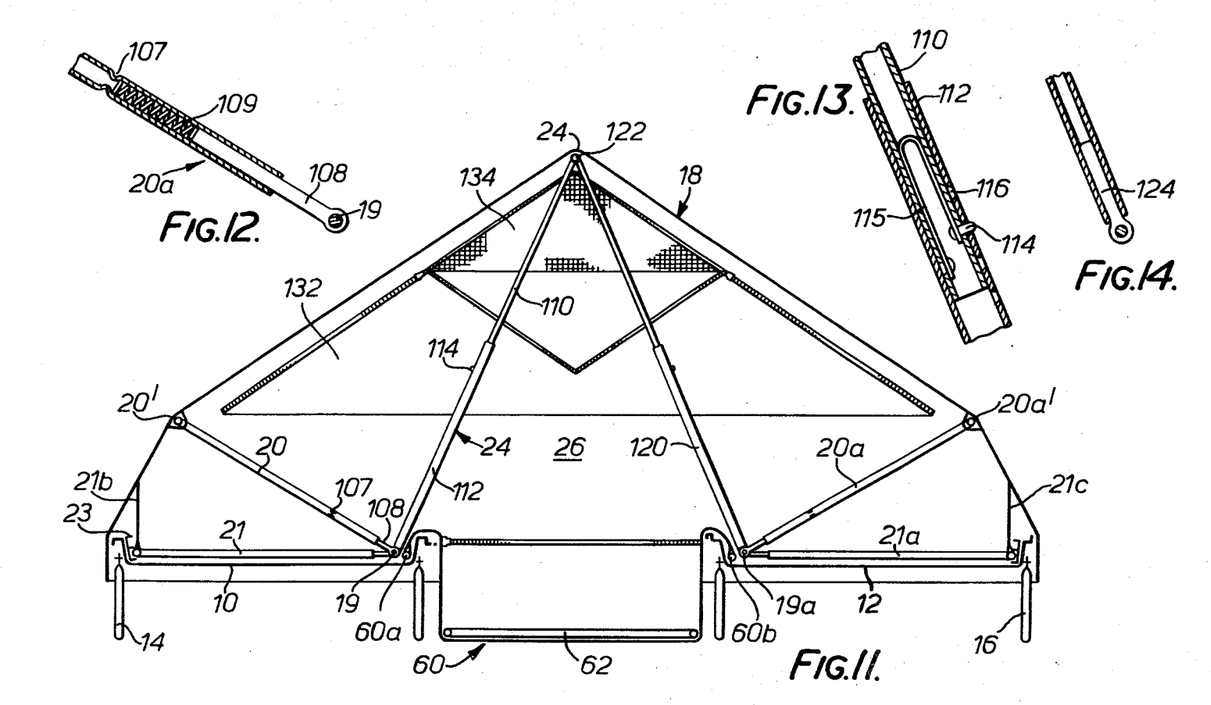
FIG. 11 is a cross-section on the line 11—11 of FIG. 10.
FIGS. 12, 13 and 14 are part axial cross-sections showing details of various ones of the framework ribs of the developed camper.

The illustrated camper includes a pair of rigid panels 10, 12 provided with respective pairs of retractable U-shaped legs 14, 16 and interconnected by flexible sheet material in the form of a waterproof woven breathing fabric 18 such as canvas or a suitable synthetic material. Fabric 18, which for purposes of clarity is hereinafter referred to as "canvas 18", is braced to the panels by framework including three pivotable U-shaped ribs 20, 20a and 24 and two stationary U-shaped ribs 21, 21a (FIG. 11). The panels 10, 12, canvas 18 and the ribs together form an assembly which may be expanded or contracted between a collapsed condition (FIGS. 1 and 2) in which the panels overlie each other and sandwich canvas 18 and the ribs between them, and a fully developed condition (FIGS. 10, 11) in which the panels are supported by their legs in spaced apart disposition aside each other and are bridged by canvas 18. In this latter condition, the canvas is extended and supported by the ribs as a raised tent cover for a space 26 above the panels.

Figures 2, 3, 4:
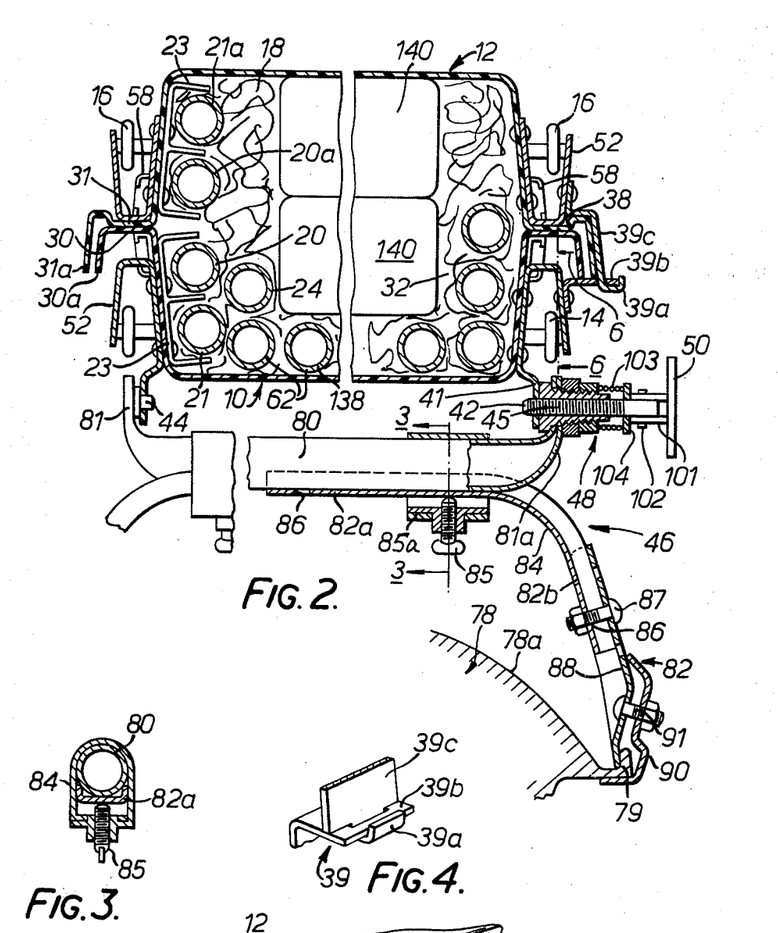
FIG. 2 is a cross-section on the line 2—2 of FIG. 1.
FIG. 3 is a cross-section on the line 3—3 of FIG. 2.
FIG. 4 is a detailed perspective view of one of the disengageable hinge assemblies forming part of the collapsed camper of FIGS. 1 and 2.

Panels 10, 12 are each suitably comprised of a rigid substantially 6 × 4 feet plate of a fibreglass-based material. Each panel is provided with an integral upstanding rim in the guise of a surrounding flange 28 or 29 which is turned outwardly at its outer edge to form a peripheral overlying flange 30 or 31. (FIG. 2). It will be seen that the flanged panels are thus in the form of shallow open-topped trays. In the collapsed condition of the assembly, flanges 30, 31 are brought into abutment so as to bound a space 32 within which sheet 18 and the frame ribs are sandwiched. Panels 10, 12 are secured together, firstly, by means of suitable clips 40 preferably provided in pairs at either end of the assembly to clamp the legs together as shown most clearly in FIGS. 1 and 5, and, secondly, by the action of hinge assemblies hereinafter described.

The collapsed assembly of the panels 10 and 12 is dimensioned for support on the cabin roof of the smallest of motor vehicles. Panel 12 is arranged to be the upper panel when the assembly is supported thus by being provided with a peripheral gutter 38 in the then upper surface of flange 31 to collect rain water and direct it from the flange at a suitable location. Flanges 30 and 31 are overturned at their outer edges to provide respective peripheral lips 30a, 31a for locating the panels together when bridging panel 10 onto panel 12. Lips 30a, 31a are directed downwardly in the collapsed condition of the assembly.

For the purpose of securing the collapsed assembly on the roof of a car, each side of the lower panel 10 is provided with a pair of spaced apart metal plate elements 41 each defining a perforation 42 arranged to key with a complementary tapered prong 44 or 45 mounted on the carry bar assembly 46 of the car 78. (FIG. 2) On one side of the vehicle, the two prongs 44 are fixed in position while on the other side each pin 45 is screw threadingly retractable in a respective bearing 48 to allow the collapsed panel assembly to be dropped into place on the bars and released therefrom when required. Prongs 44, 45 are mounted in pairs at opposite unturned and pinched ends 81, 81a of carry bars 80. Bars 80 extend tranversely of the vehicle and are each secured to the gutters 79 defining the side boundaries of the cabin roof 78a by respective clamp assemblies 82. One of the assemblies is shown in detail in FIG. 2. It includes a generally curved leg piece 84 having two arcuately joined straight, shallow-channelled portions 82a, 82b on which the associated carry bar 80 may be rested in a close fit (FIG. 3) so as to prevent relative scissors motion and rotation of the parts. The leg and bar are clamped together by means of a slidable collar 85a having a bolt or screw 85.

One of the channeled portions 82a, is longer than the other 82b and both provided with apertures 86 for engagement of the leg piece with a truncated triangular shoe 88 by means of a nut and bolt 87. Shoe 88 rests in the gutter 79 and is clampled in position by way of a detachable plate 90 and further nut and bolt 91. Plate 90 has an unturned portion 90a which engages under gutter 79 and is gradually drawn upwardly as the nut is tightened by virtue of the slanted alignment of the bolt.

Bolt 87 may be threaded through one of three vertically spaced apertures in shoe 88. Leg piece 84 is so dimensioned and the apertures 86 so placed that the choice of the former's two alternative dispositions and the choice of three apertures in shoe 88 gives six discrete heights at which the carry bars may be located.

The outer ends of the retractable pins 45 are provided with respective disc pads 50. Each of these pads (FIGS. 2 8, and 9) carries yoke arms 101 between which the shaft of the prong 45 is received and retained by way of a transverse pin 102 about which the pad is freely rotatable. As mentioned, prong 45 is screw threadingly rotatable in its bearing and the pad accordingly has three degrees of freedom in the rotational sense. In particular, it can pivot from a horizontal condition just above the top edges of carry bars 80 (FIG. 8) to a vertical condition facing transversely lateral away from the vehicle. A spring 103 acts on a ring 104 engaging yoke 101 to serve as an indexing mechanism.

Figure 7:
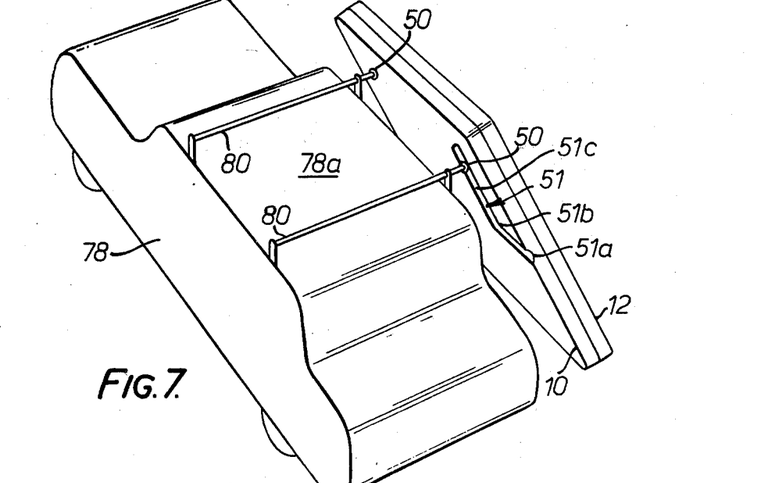
FIG. 7 is an overhead perspective depicting the collapsed camper immediately after it has been lowered off the vehicle from the condition shown in FIG. 1.
Figure 8:
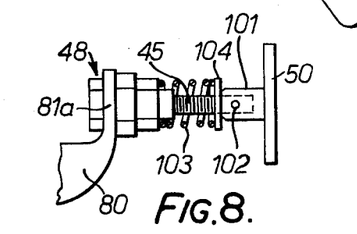
FIGS. 8 and 9 are side views of one of the adjustable prong and pad assemblies forming part of the vehicle roof mount for the collapsed camper, the pad of the assembly being respectively shown in two extreme positions.
Figure 9:
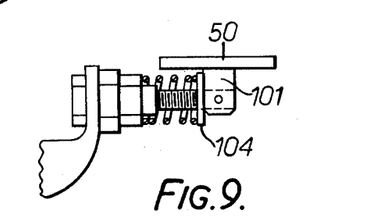

When it is desired to lift the assembly from the carry rack, the pads 50 are rotated about the axis of their respective prongs 45 while in the condition of FIG. 8 to disengage the prongs from the perforations 42. The assembly is then lifted away from prongs 44 and pulled back towards the pads 50 which are now turned to the condition of FIG. 9. One of the pads engages a close fitting track 51 on the underside of panel 10 at end 51a of the track (FIG. 7). Further sideways movement of the assembly is possible until this pad reaches a right angle bend 51b in track 51. The assembly is then rotated through 90° to bring the longitudinal dimension of the assembly to a position transverse of the car. On further pulling, guide pad 50 slides along the second part 51c of track 51 as the whole assembly is tipped over the side of the car and a shorter edge brought to rest on the ground. The collapsed camper is now in the position shown in FIG. 7 and it will no doubt be appreciated that reverse procedure is used to lift the camper onto the carry rack, the engagement of the pad 50 and track 51 guiding the camper back to its transport position.

Legs 14, 16 are each of a generally broad U-shaped and extend the full width of the associated panel. Each leg is pivoted at its free ends from its associated panel within a U-bracket 52 and braced by a pair of guide struts 54. Each strut (FIG. 6) is provided at one end 54a to a side arm of the leg and at the other carries a pin 56 which is slidable during extension and retraction of the leg along a track 58a defined by a double metal channel 58 secured to the adjacent edge of the panel. An over-centre arrangement is thereby provided whereby, once a given leg is opened out beyond the vertical position, the reaction of the ground surface on the leg tends to slide its bracing struts along their tracks 58a in the direction opposite to that required to collapse the leg. In this way, each strut is clamped against one end 59 of channel 58.

The panels 10, 12 are provided with means to permit panel 12 to be hinged upwardly and outwardly relative to panel 10 to bring it to the same attitude as but to one side of panel 10. This means is such that the panels can then be automatically separated and thus comprises a pair of disconnectable hinge assemblies 39 (FIGS. 2, 4). Each of these assemblies 39 comprises a looped metal tongue 39a fashioned at the outer edge of a bracket 39c fixed to one of the leg mounting U-brackets 52 of panel 12 and a co-operating slotted bracket 39b secured to the adjacent U-bracket on panel 10. Tongue 39a and bracket 39b are so positioned relative to each other that as panel 12 approaches a position alongside panel 10 and the two are supported on a common level ground by their legs 14, 16, bracket 39c with its tongue 39a will automatically rise above bracket 39b to disengage the hinge assembly and separate the panels. In the collapsed condition of the assemblies, the hinges assist in clamping the panels together.

Figures 5, 6:
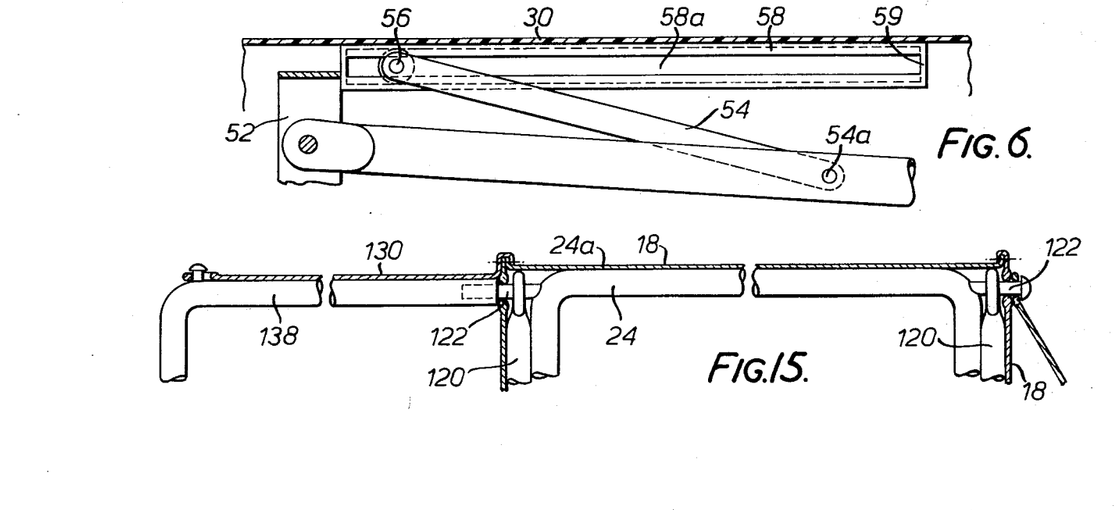
FIG. 5 is a perspective view of a corner of the collapsed camper of FIGS. 1 and 2.
FIG. 6 is a cross-section on the line 6—6 in FIG. 2.
Figure 5:
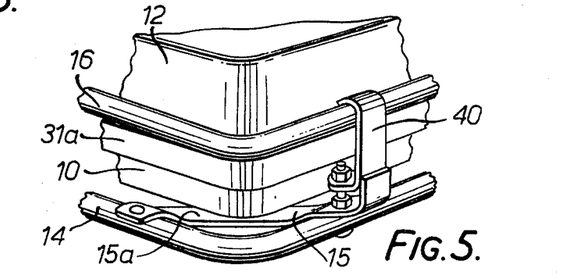

FIG. 5 shows an arrangement for lessening risk of damage to lower panel 10 if it is placed on the ground. The four corners of the legs of this panel are braced by a metal plate 15 providing a seat 15a for the panel at a level above the ground engaging edge of the legs when they are retracted and tied by clips 40. It will be noted generally that the legs provide all round protection for the panels providing an impact absorbing barrier at all lateral edges of the collapsed assembly as well to its underside.

Canvas 18 is secured by eyelets or the like to frame ribs 20, 20a and 24 and by false hems 21b, 21c to ribs 21, 21a. Ribs 20, 20a, 21, 21a comprise generally U-shaped aluminum tubing. They are pivotally connected at 19, 19a at their free ends to the respective panels 10, 12 adjacent either end of the hingable edges. Ribs 20, 20a are spring loaded as shown in FIG. 12 by fitting the tubing over a pin 108 which is actually pivoted at 19 or 19a and retaining a helical compression spring 109 between this pin and crimped-in notches 107 on the inside surface of the tubing.

Rib 24 is of a generally similar construction to ribs 20, 20a and is pivoted in common with ribs 20, 21 to panel 10, but is telescopically extensible to a height somewhat greater than that of frame members 20, 21 by means of the arrangement shown in FIG. 13. A relatively smaller upper tube 110 is telescopically received within a larger lower tube 112 and carries a locating pin 114 on one end of a spring metal strip 115 secured within the tube. Pin 114 projects through an aperture in tube 110 and is selectively engageable with chamfered apertures 116 in tube 112. To release the engagement, finger pressure is first used to depress the pin into its aperture 116 and then the sloping edge of the aperture assists in forcing the pin into tube 110 on application of force to telescopically separate the tubes.

In the collapsed condition of the assembly, ribs 20, 20a, 21, 21a and 24 lie within enclosure 32 and all except rib 24 are clipped under resilient retaining brackets 23 mounted to the inside longitudinal edge of the enclosure. As the panel 12 is hingedly rotated relative to panel 10 and then moved laterally away from the latter on disconnection of the hinging, the fixed spacing of the ribs 20, 20a determined by the canvas 18 causes these ribs to rotate upwardly from their associated panels as the canvas is tautened after release of the ribs from brackets 23. Rib 24 will lift from panel 10 to define a gable 24a for the canvas cover at a position centrally above the space between the panels 10, 12 and can then be telescopically extended to increase the clearance in the centre of the resultant tent structure and fully extend the canvas material. Ribs 20, 20a will now define outer roof lines 20', 20a' to give adequate clearance above panels 10, 12. Ribs 21, 21a remain in position within the panels 10, 12 to hold down the canvas, which is loose at its outer edge and is lifted out (FIG. 11) from a tucked away position within the two rigid panels.

Cords may be stretched directly and/or diagonally between the frame members to tauten and further strengthen and support the developed structure.

A further pair of telescopic bracing struts 120, are provided to strengthen the gable 24a. Each strut is fixed to the upper run of rib 24 by a pin 122 (FIG. 15) and is locked in place by being engaged over a pin 124 (FIG. 14) pivoted at 19a to panel 12.

Figures 16, 17, 18:
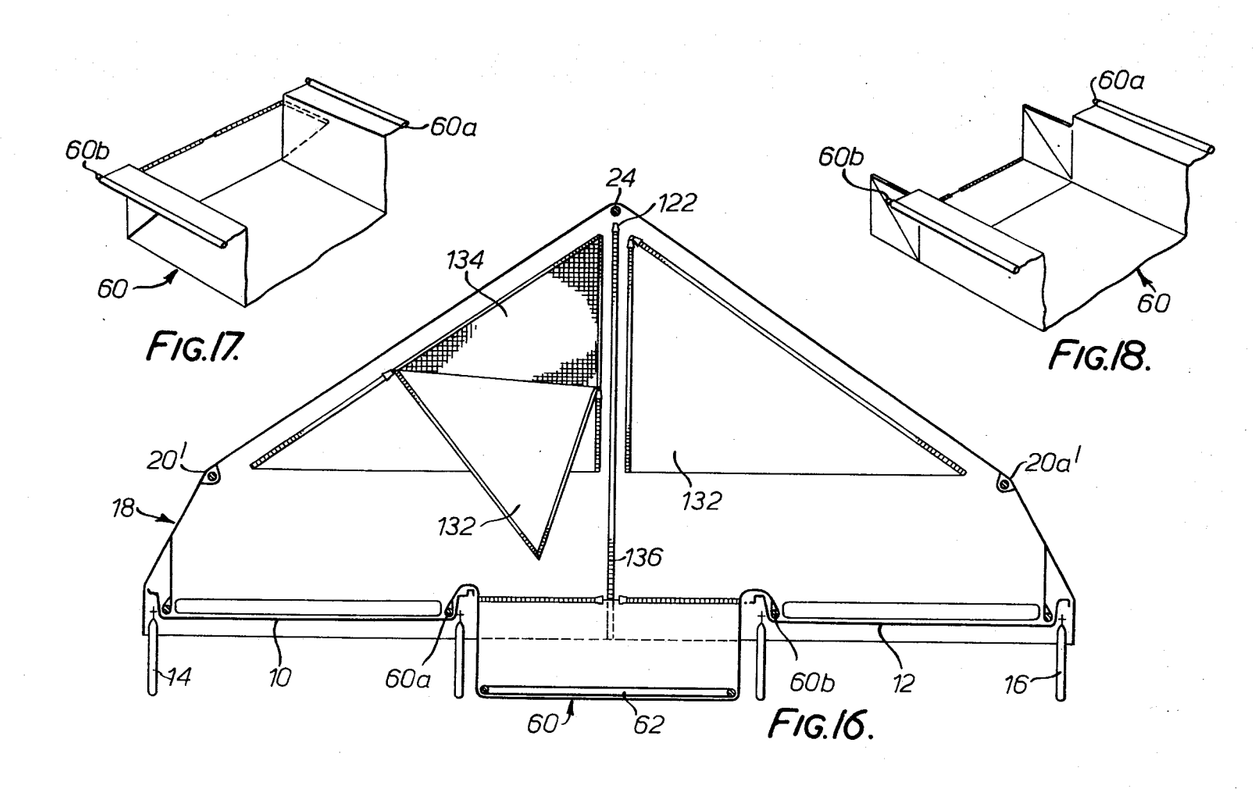

A drop-down bucket floor 60 normally stored within panel 10 may then be positioned in the gap between the panels. It is sleeved to weighting rods 60a, 60b which are rested within the opposed edges of panels 10, 12 bounding the gap (FIG. 11). A rectangular metal loop 62 normally carried in panel 10, is provided to tauten floor 60 and to act as a weight to hold it firmly on the ground in a shape which resembles a shallow open topped box and which defines the spacing of panels 10, 12. At one end this box can be opened for walk through facility (FIG. 18) or folded up and zipped shut to canvas 18 (FIG. 17).

Once the bucket floor is in place, the basic camper has been fully developed. Pegs 150 (FIG. 10) can be used in windier conditions to stake down legs 14, 16, but it is found generally that extended guy ropes are not required which constitutes an advantageous safety feature. The panels 10, 12 may each provide two double berth sleeping accommodation and for this purpose are typically provided with matching foam mattresses 140 seated within the recesses provided by the flanges 28, 29. In practice, it is preferred that the mattresses are tied together in the foldable panel 12 (FIG. 2) as it is desirable that the mattresses come down on top of the framework during collapsing of the camper. The central part of the tent above the bucket floor 60 serves as working space and can be provided with tables or cooking equipment as desired. Suitable flaps and/or flywire inserts such as the extension flap 130 window flaps 132 and meshing 134 shown in FIGS. 10, 11 and 16, would of course be formed integrally with sheet 18 as desired at one or both ends of the working space to provide sealable doorways, ventilation openings, verandahs and the like.

In the case of the verandah, an additional tube 138 may be required, as shown in FIG. 15. Various fasteners, include a door zipper 136, provide for weather sealing of the flaps when needed.

When it is desired to collapse the assembly and take leave of a campsite, the metal loop 62, drop down floor 60 and verandah tube 136 are first lifted out and deposited into panel 10. Struts 120 are disengaged and rib 24 retracted, and then the panel 12 is brought up to panel 10 and their hinges operatively connected. The free edge of panel 12 is then raised upwardly and downwardly to rotate panel 12 over onto panel 10. During this movement the ribs 20, 20a and 24 together with struts 120 and canvas 18 will be progressively sandwiched into the space between the panels. Clips 40 are brought into play after the legs 14, 16 have been retracted. The panel assembly is then carried to and brought against pads 50 and lifted up and over on to roof rack 46 for locking engagement with the pins 44, 45.

In accordance with the invention, it is important that the weight of the illustrated camper assembly be such that the expansion and contraction operations, including transfer to and from a vehicle roof, can be performed by one person without the aid of inboard mechanical lifting devices. To this end, the weight of the assembly, primarily provided by the panels, framework and canvas, should be less than 120 lbs. and prefrably no more than 110 lbs. A prototype unit of the form illustrated has a total gross weight of about 110 lbs. of which about 80 to 90 lbs is contributed by the panels, framework and canvas and about 25 lbs by the mattresses. A weight of this order allows assembly by a woman in a matter of minutes, including overground transport if required does not place excessive strain on the cabin roof of a car and enhances fuel economy when comparisons are made with the much heavier and bulker roof campers and towable trailer campers of the kinds outlined previously. At the same time, considerations of strength and rigidity, particularly in the panels, suggest a desirable lower limit for the rest mass of at least 60 lbs.

The camper provides a relatively lightweight and highly compact unit which may be dimensioned for transport on the smallest of vehicles and yet not place any undue strain on the car. In addition, the special driving skill necessary to safely haul trailers is not required. The unit is manually dismountable from the vehicle and completely separated therefrom in its developed condition.

While the above-described and illustrated embodiment is of a double-tray, 4-berth form, it will be appreciated that the invention is not limited to such a structure. A simple unit comprising a single panel and minimal canvas and framework is of course envisaged by the invention, although of course the range of desirable weight of the panel, framework and sheet material is then substantially reduced to the area of 30 to 60 lbs., with an upper limit of 75 lbs.

I claim:

1. A camper assembly comprising:
    a substantially rigid base panel having a relatively shallow upstanding flange about its periphery which bounds a surface for receipt of a mattress and being dimensioned for transport on the cabin roof of a passenger road vehicle;
    a pair of spaced apart U-shaped legs each pivotally mounted to said flange at opposite sides of the base panel and extending under the base panel in a direction opposite the direction of protrusion of the flange, which legs are extensible from retracted positions adjacent the base panel to extended positions in which they may support the panel on but above a ground surface;
    at least two rib members secured to the base panel and pivotally extensible upwardly from retracted positions adjacent said base panel, one of the rib members being linearly extensible to substantially increase its clearance from the base panel; and
    a cover of flexible sheet material secured to the rib members and to the base panel with such slack in the retracted positions of the rib members that on extension of the rib members until the cover is taut, said one rib member projects laterally therefrom so that the cover extends above an annex area adjoining the base panel, while another rib member overlies the base panel at a lower height than said one rib member.

2. An assembly according to claim 1 wherein said legs are mounted adjacent respective opposite ends of the panel and are dimensioned so that in their retracted positions they extend snugly about said opposite ends.

3. An assembly according to claim 1 wherein said base panel flange is out-turned to provide an overhanging rim about the flange.

4. An assembly according to claim 1 wherein the retracted rib members and slackened cover are retained adjacent said surface within the peripheral flange of the base panel.

5. An assembly according to claim 1 wherein the legs are braced to the base panel by struts which upon extension of the legs, reach a limit position in which they tend to bias the legs to further extension when the legs support the weight of the panel above a ground surface.

6. An assembly according to claim 1 wherein the ribs are generally squared U-shaped, and said one rib is linearly extensible by being telescopically extensible.

7. A combination according to claim 6 wherein said base panel flanges are out-turned to provide overhanging rims about the flanges.

8. A combination according to claim 6 wherein the legs are braced to the base panel by struts which, upon extension of the legs, reach a limit position in which they tend to bias the legs to further extension when the legs support the weight of the respective panel above a ground surface.

9. A combination according to claim 6 wherein the ribs are generally squared U-shaped and the ribs overlying the annex area are linearly extensible by being telescopically extensible.

10. A combination according to claim 6 wherein the retracted rib members and slackened cover are sandwiched between the two base panels within the flanges thereof.

11. A combination according to claim 10 including co-operating means on respective opposed side-edges of the panels for hingedly engaging the panels to allow expansion of the assembly by hingedly turning one panel about the other from the sandwiching condition, which means are readily separable when the panels lie aside one another to allow the panels to be spaced apart.

12. A combination according to claim 11 wherein said co-operating means comprises a pair of curved metal tongues on one panel and respective co-operating slots on the other, the arrangement being such that when the panels are placed horizontally side-by-side with the tongue and slot adjacent, the tongue may be engaged with the slot by slight adjustment of the position of one or other of the panels.

13. In combination in a unitary camper, a pair of assemblies each said assembly comprising:
    a substantially rigid base panel having a relatively shallow upstanding flange about its periphery which bounds a surface for receipt of a mattress and being dimensioned for transport on the cabin roof of a passenger road vehicle;
    a pair of spaced apart U-shaped legs each pivotally mounted to said flange at opposite sides of the base panel and extending under the base panel in a direction opposite the direction of protrusion of the flange, which legs are extensible from retracted positions adjacent the base panel to extended positions in which they may support the panel on but above a ground surface;
    at least two rib members secured to the base panel and pivotally extensible upwardly from retracted positions adjacent said base panel, one of the rib members being linearly extensible to substantially increase its clearance from the base panel; and
    a cover of flexible sheet material secured to the rib members and to the base panel with such slack in the retracted positions of the rib members that on extension of the rib members until the cover is taut, said one rib member projects laterally therefrom so that the cover extends above an annex area adjoining the base panel, while another rib member overlies the base panel at a lower height than said one rib member;

wherein the covers of the two assemblies comprise a common cover bridging all of the at least four ribs to the two base panels and wherein said annex area lies between the base panels when the latter are supported adjacent one another above a common ground surface and the ribs extended to taughten the cover.

14. A combination according to claim 13 wherein the two legs of each panel are mounted adjacent respective opposite ends of the panel and are dimensioned so that in their retracted positions they extend snugly about those ends.

15. A vehicle roof mount for supporting a camper assembly comprising:

a carry frame;

means to detachably mount the frame on the cabin roof of a vehicle;

respective spaced sets of prongs for engaging the collapsed assembly along respective sides thereof and so retaining it on the carry frame, one set of which prongs being withdrawable to release the assembly; and a pair of pads on which to rest the assembly during lifting of the latter onto or from the carry frame, which pads define respective pad surfaces for engaging an underside of the assembly and are so mounted that the pads are freely rotatable about each of two mutually perpendicular axes, rotation about one axis being effective to move the pad surfaces between an upwardly facing condition just above and to one side of the carry frame and a condition in which they face laterally outwardly of the frame.

* * * * *